United States Patent [19]

Schäfer

[11] Patent Number: 4,499,943
[45] Date of Patent: Feb. 19, 1985

[54] APPARATUS HAVING A DRYER FOR ORGANIC SUBSTANCES

[76] Inventor: Otmar U. Schäfer, Pienzenauerstrasse 9, 8000 Munich 80, Fed. Rep. of Germany

[21] Appl. No.: 504,178

[22] Filed: Jun. 14, 1983

[30] Foreign Application Priority Data

Jun. 16, 1982 [DE] Fed. Rep. of Germany ....... 3222700

[51] Int. Cl.³ .................... F23L 15/02; F23D 17/00; F24D 23/02
[52] U.S. Cl. ........................................ 165/95; 165/5; 432/2
[58] Field of Search ................... 432/2, 219, 220, 221, 432/266; 165/4, 5, 95, DIG. 28

[56] References Cited

U.S. PATENT DOCUMENTS 2,514,084 7/1950 Mowat ................................ 432/219
3,870,474 3/1975 Houston ................................ 165/4

Primary Examiner—John J. Camby

[57] ABSTRACT

In a plant having a dryer for organic materials, especially wood chips through which hot gas from a combustion chamber can be passed, and the exhaust gases, laden with combustible contaminants, can be passed through indirect heat exchangers, by-pass ducts carrying exhaust gas from the dryer are associated with the heat exchangers, along with hot gas ducts to and from the combustion chamber. After a heat exchanger has been shut off from the exhaust gas stream from the dryer, the same heat exchanger can be connected for cleaning to a portion of the hot gas from the combustion chamber.

6 Claims, 5 Drawing Figures

APPARATUS HAVING A DRYER FOR ORGANIC SUBSTANCES

BACKGROUND OF THE INVENTION

The invention relates to an apparatus in accordance with the general part of Claim 1.

In the operation of dryers with hot gas, efforts have been made for some time to recover the heat contained in the exhaust gases of the dryer by passing them through one or more indirectly acting heat exchangers whereby a second fluid medium is heated. In many cases it is unavoidable that the hot gas flowing through the dryer picks up contaminants. In the drying of wood chips, for example, wood dust and natural and artificial resins as well as terpenes are picked up, which condense and precipitate in the heat exchangers due the cooling of the exhaust gases.

Through the article, "Waermerueckgewinning in industriellen Trockneranlagen" [heat recovery in industrial dryers] by H. Hausmann, printed in the "Haus der Technik" lecture text, Essen, May 30-31, 1978, heat exchangers of a modular or drawer type became known, from which small, drawer-like exchanger units can be temporarily withdrawn and can be cleaned individually in baths by means of a washing liquid. The periodical manipulation and cleaning of the drawers must be performed by hand or by an expensive apparatus, and requires, as a rule, the presence of several workers. Furthermore, to forestall the fouling of a heat exchanger, it is also known to remove impurities from the exhaust air with great effort and at great expense by means of active carbon filters, thermal afterburning, electrical filters, and fiber mat filters.

German Offenlegungsschrift No. 30 09 938 discloses an apparatus having a dryer for organic substances in accordance with the general part of Claim 1, in which, for the cleaning of a heat exchanger, a heating gas circuit is intermittently connectable to the heat exchanger in place of the exhaust gas circuit, the heating gas circuit containing a collector means in the form of filters which is separate from the first heat exchanger, and these filters are preferably combustible so that, after they have become charged with harmful substances from the cleaning gas, they can be removed and crushed and used for heating purposes. In this apparatus, several heat exchange units can be provided in parallel or in series, and exhaust gas or heating gas is fed to them in an alternating cycle.

The use of a collector means having a number of filters which have to be periodically replaced, in conjunction with an additional burner for the production of the hot gas in the heating gas circuit, appears to be relatively expensive and complex.

It is the object of the invention to make it possible, in an apparatus of the kind described, to clean fouled heat exchangers without the need for a filtering system and a separate burner.

BRIEF SUMMARY OF THE INVENTION

This object is achieved by the present invention.

While the derivation of the heating gas stream from the combustion chamber supplying the dryer is simple and eliminates the need for a separate hot gas source, if the hot gas stream which passes through the heat exchanger being cleaned and carries the re-vaporized and released impurities is returned into the combustion zone of the combustion chamber, this will cause the impurities to be burned in a chamber that is sealed off against the danger of explosion, in which combustion is already in progress. Except for the routing of the exhaust gases as required for the cleaning of a heat exchanger and the admission of the hot gas stream by appropriate opening and closing of valves, no further manipulation is necessary. The valve operations can be performed automatically at suitable intervals of time.

In the drawing the invention is represented by way of example.

DETAILED DESCRIPTION OF PREFERRED EMBODIMENTS

Figure 1:
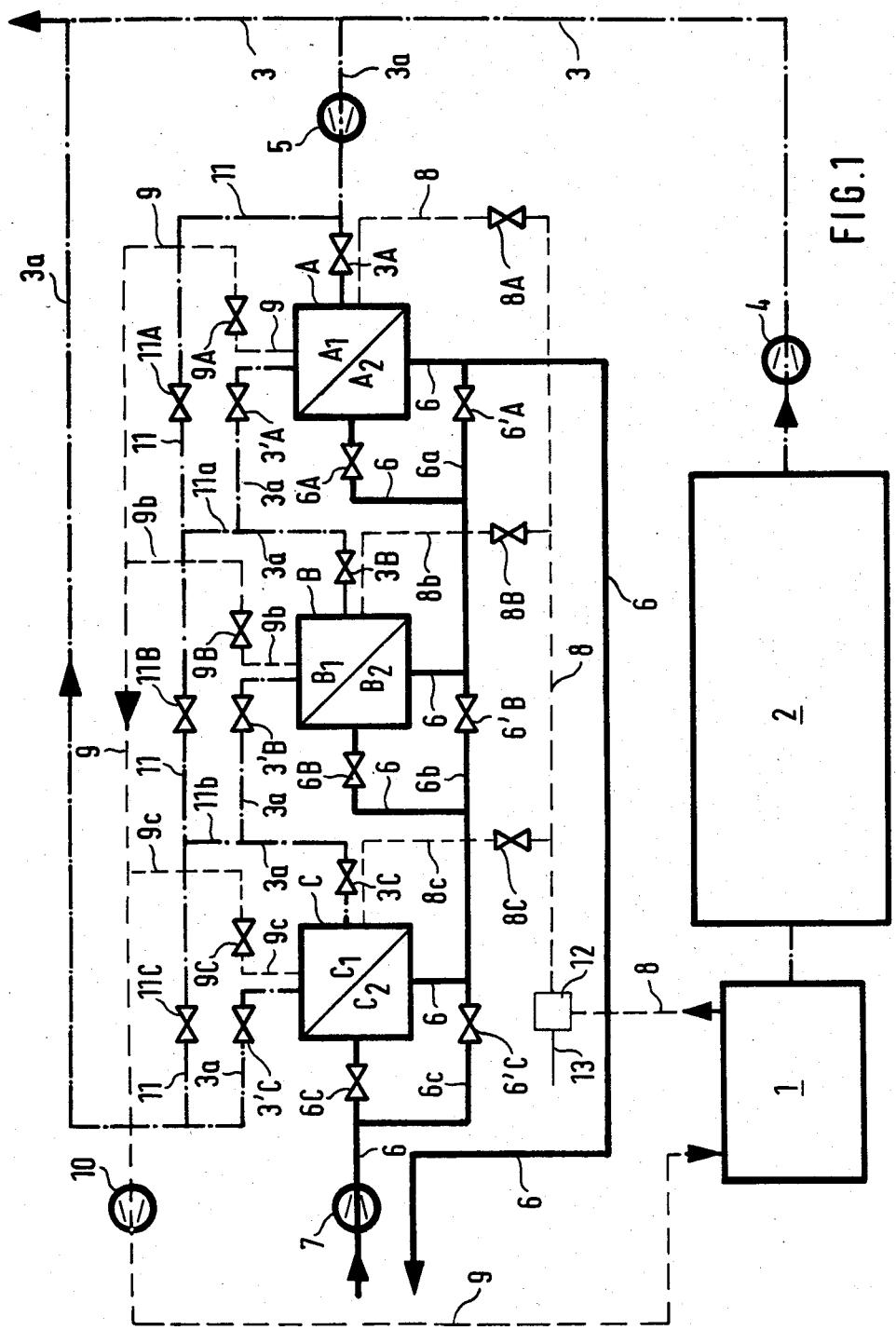
FIG. 1 is the flow diagram of a drying apparatus with three heat exchangers for the recovery of heat from the exhaust gases from the apparatus, and with the system for the cleaning of the heat exchangers.
Figure 2:
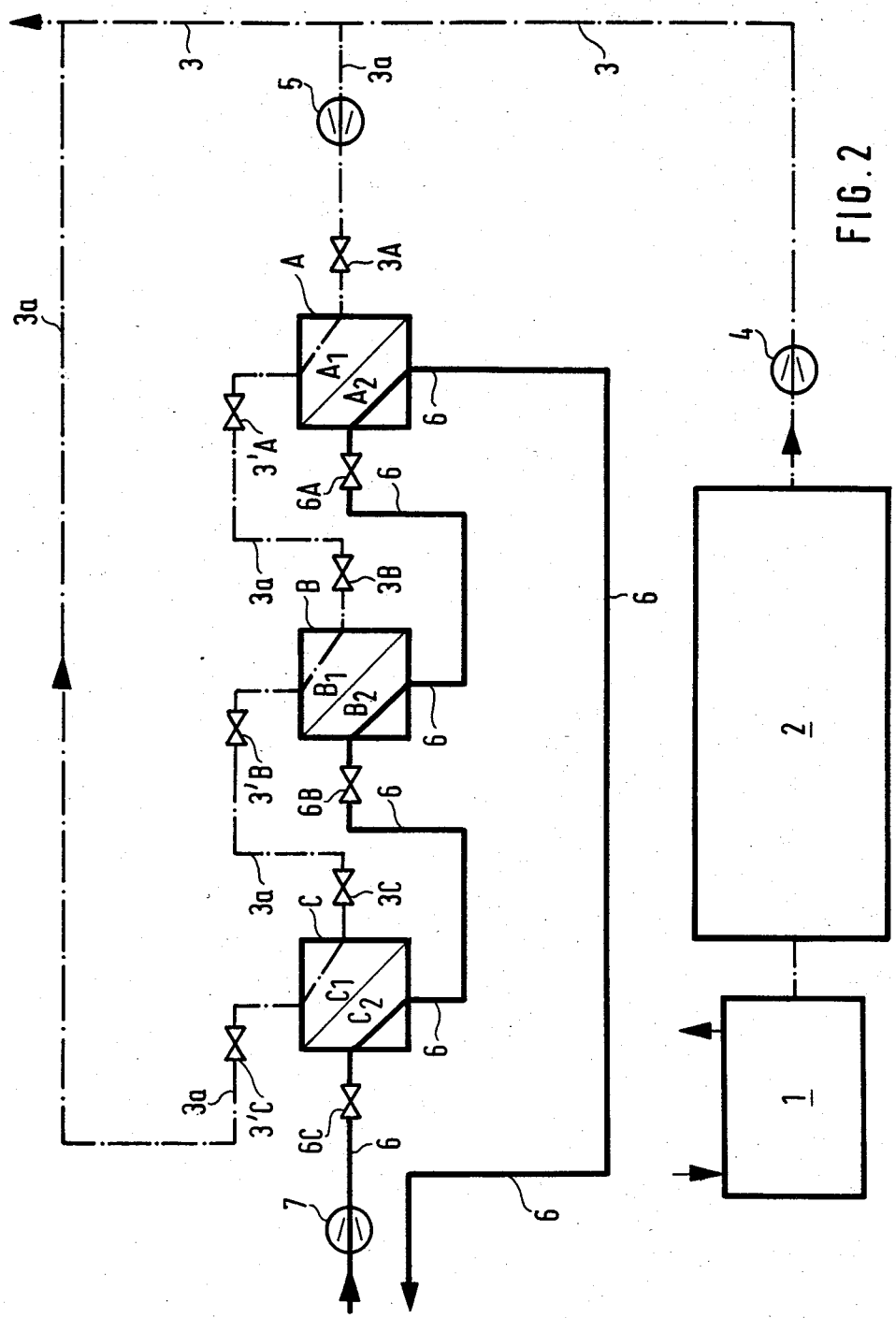
FIG. 2 shows the same dryer system with all three heat exchangers operatively connected to the exhaust gas stream.
Figure 3:
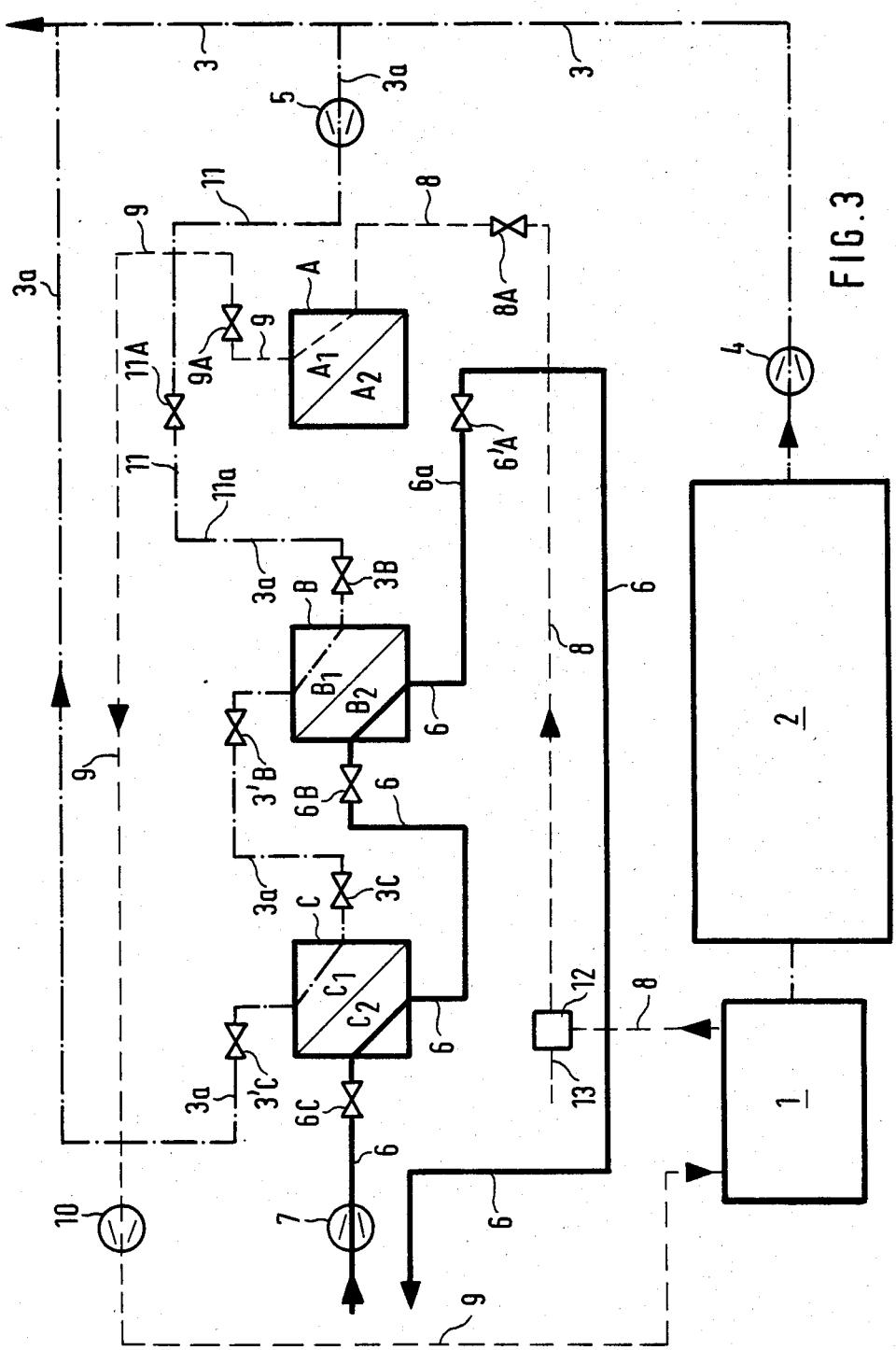
FIG. 3 shows the same system in which the right-hand heat exchanger is connected to the cleaning apparatus.
Figure 4:
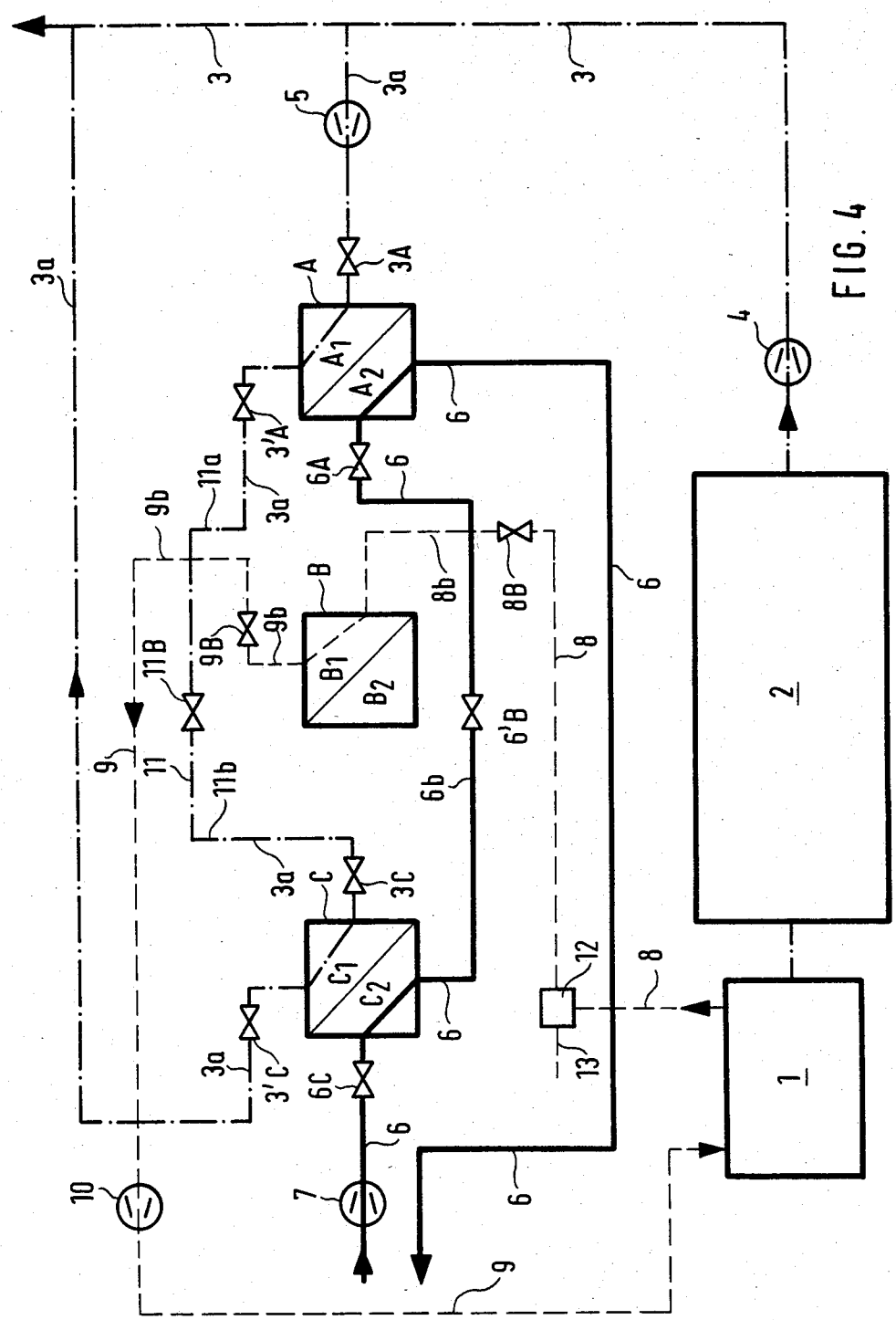
FIG. 4 represents the same system with the middle heat exchanger connected to the cleaning apparatus.
Figure 5:
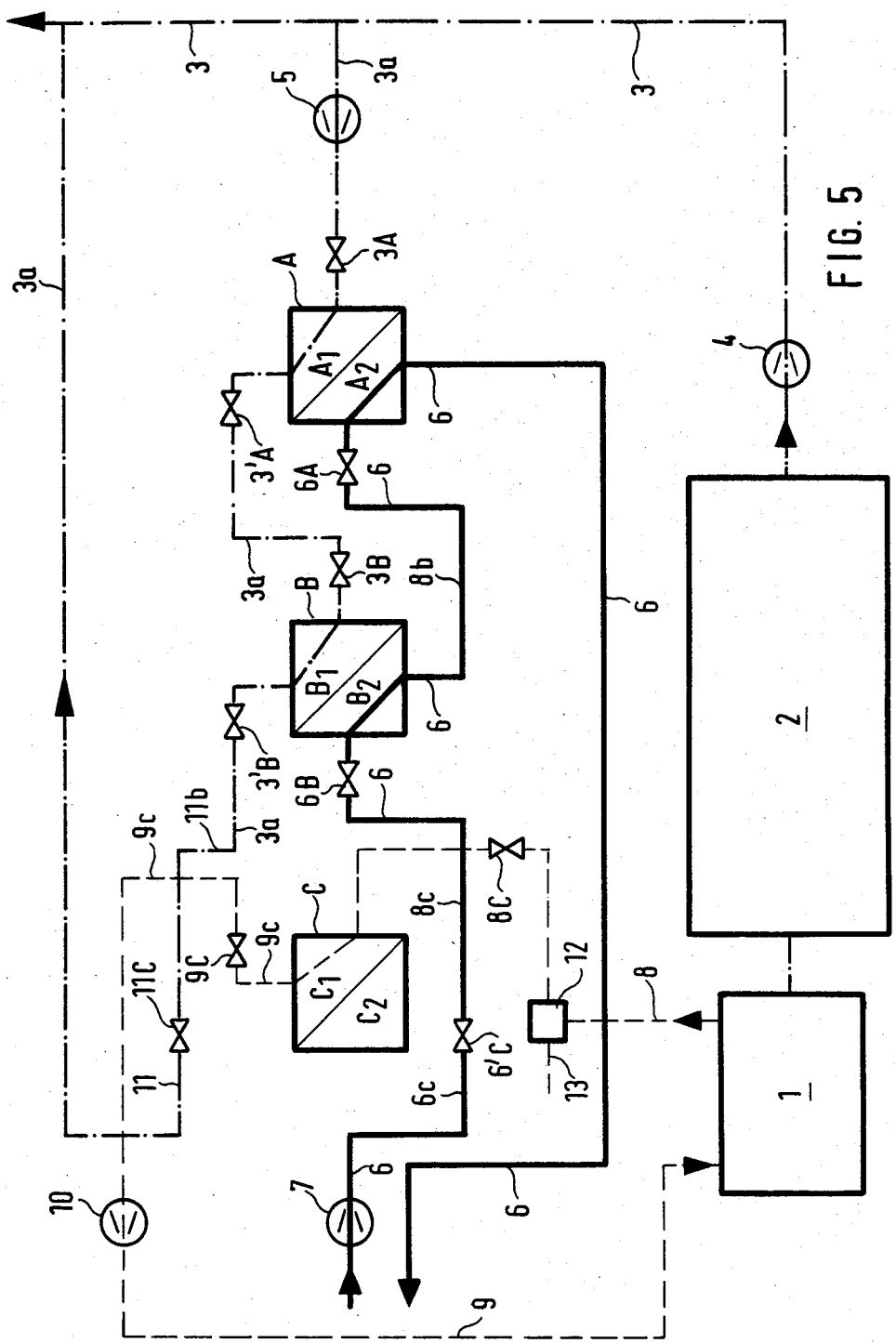
FIG. 5 represents the same system with the left heat exchanger connected to the cleaning apparatus.

As best seen in the flow diagram of FIG. 1, the drying apparatus has a conventional combustion chamber 1 in which ambient air is heated by the burning of an appropriate fuel, such as fuel oil for example. The hot gas produced is fed to a dryer 2 connected to the output end of the combustion chamber 1, and in it moisture is removed from the wet material to be explained further on, and is picked up and removed by the hot gas. The hot gas flowing over and around the material being dried leaves the dryer 2 as exhaust gas and is fed through series-connected chambers $A_1$, $B_1$ and $C_1$ of three indirectly acting heat exchangers A, B and C. In like manner the heat exchangers A, B and C have the chambers $A_2$, $B_2$ and $C_2$ which are in heat exchange with the chambers $A_1$, $B_1$ and $C_1$.

To enable the hot gas put out by the combustion chamber 1 to flow through the dryer 2 swiftly in spite of the unavoidable flow resistances, a fan 4 is provided on the output side of the dryer 2, and blows the exhaust gas through a tubular flue 3 and into a chimney, for example, to the atmosphere. The duct 3a is connected to the flue 3 for the purpose of taking a desired percentage (including 100%) from the exhaust gas stream in flue 3 for passage through the heat exchangers A, B and C. For this purpose an additional fan 5 is disposed ahead of the first heat exchanger A. Instead of this, the duct 3a could also be connected through a valve to the flue 3, so as thus to lead a more or less large portion of the exhaust gas stream, not directly but by the round-about route through the duct 3a and the heat exchangers, to the chimney. In the latter case the fan 5 could be eliminated. If the entire exhaust gas stream from the dryer is to be constantly led through the heat exchangers, then a direct connection of the flue 3 to the chimney would, of course, be unnecessary, and in this case too one of the two fans 4 and 5 would suffice.

In the embodiment, the heat exchange medium, fresh air in this case, is heated in the chambers $A_2$, $B_2$ and $C_2$;

the fresh air is carried in another duct 6 countercurrently to the exhaust gas, so that it flows first through the chamber $C_2$ of the heat exchanger C, then through chamber $B_2$ of heat exchanger B, and lastly through chamber $A_2$ of heat exchanger A. Here again a fan 7 disposed ahead of heat exchanger C serves to sustain a suitable rate of flow of the fresh air into the said chambers, and thus to assure a good heat exchange in the heat exchangers A, B and C. The heated fresh air can be utilized in any desired manner in the plant equipped with the dryer system, and for example it can be fed (in a manner not shown) to the combustion chamber 1 as preheated combustion air.

The material to be dried is one, such as wood chips for example, which in drying contaminates the hot gas flowing through it with vapors and entrained components such as wood dust and natural and synthetic resins as well as terpenes. Since these impurities condense and precipitate in chambers $A_1$, $B_1$ and $C_1$ of the heat exchangers A, B and C when the exhaust gases cool therein, the heat exchangers A, B and C become filled with these contaminants, which have to be removed from time to time. The cleaning apparatus represented in the drawing in conjunction with the drying apparatus, and described hereinbelow, serves for the removal of these impurities.

As it can be further seen in FIG. 1, an additional duct 8 runs from the output end of the combustion chamber 1 to a point adjacent the point of the entry of duct 3a into chamber $A_1$ of heat exchanger A, where it too enters this chamber. The branches 8c and 8b of duct 8 also run into chambers $C_1$ and $B_1$ of heat exchangers C and B, respectively. Another duct 9, which runs from chamber $A_1$ of heat exchanger A adjacent the point of connection of duct 3a to the output side, leads back into the combustion zone of combustion chamber 1. Furthermore, branches 9b and 9c run to associated chambers $B_1$ and $C_1$ of heat exchangers B and C, respectively. The points at which these branches 9b and 9c are connected to the chambers $B_1$ and $C_1$ are in each case adjacent to the outlet connections of the duct 3a. By connecting the ducts 8 and 9 through one of the three heat exchangers A, B and C, as will be explained below, a hot gas circuit formed with a portion of the hot gas produced in the combustion chamber 1 results when a fan 10 in the duct 9 between the junction of the branch duct 9c and the combustion chamber 1 is turned on.

To enable each of the chambers $A_1$, $B_1$ and $C_1$ to be shut off independently from the duct 3a so as to clean out condensed and precipitated exhaust gas contaminants, and instead to be connected at their input end to the duct 8 or to one of its two branch lines 8b and 8c, and at their exhaust end to the duct 9 or to one of its two branch lines 9b and 9c, a shut-off means 3A is provided in line 3a at the input end of heat exchanger A and a shut-off means 3'A at the output end thereof, a shut-off means 3B is provided at the input of heat exchanger B and a shut-off means 3'B at the output end thereof, and a shut-off means 3C is provided at the input end of heat exchanger C and a shut-off means 3'C at the output end thereof; in the duct line 8 a shut-off means 8A is provided at the input end of heat exchanger A, a shut-off means 8B in the branch line 8b, a shut-off means 8C in the branch line 8c, and in the duct line 9 a shut-off means 9A is provided at the output end of heat exchanger A, a shut-off means 9B in the branch line 9b and a shut-off means 9C in the branch line 9c; and by the operation of these shut-off means as explained below, the heat exchangers can be shut off from the exhaust gas stream and connected to the hot gas circuit.

So that the heat recovery will not have to be interrupted when the duct 3a is interrupted by the shutting off of one of the heat exchangers A, B or C, a bypass duct 11 branches off from the duct 3a ahead of the heat exchanger A and leads back into duct 3a at the outlet side of the shut-off means 3C. The bypass duct 11 is furthermore in communication with duct 3a between the two heat exchangers A and B through a branch 11a, and between the two heat exchangers B and C through a branch duct 11b. Moreover, in the bypass duct 11, a shut-off means 11A is provided between the point where the bypass is connected to duct 3a and the branch duct 11a, a shut-off means 11B is provided between the two branch ducts 11a and 11b, and a shut-off means 11C is provided between the branch duct 11b and the point of return to the duct 3a.

For the drying of wood chips, which is the purpose of this embodiment, a hot gas temperature of preferably about 400° to 500° C. at the input end is selected, while the exhaust gas temperature in duct 3a and in the heat exchangers A, B and C is at a considerably lower level, amounting, for example, to 110° to 150° C. in the first heat exchanger A through which it passes. Accordingly, condensation and precipitation of contaminants contained in the exhaust gas is to be expected in the heat exchangers A, B and C. To enable these contaminants of the heat exchangers A, B and C to be reliably vaporized and removed, a hot gas temperature of about 400° to 500° C. is needed in the duct 8 ahead of the heat exchangers A, B and C.

Now, if during the cleaning operation the still more or less cold fresh air were to continue to flow in the fresh air chamber $A_2$, or $B_2$ or $C_2$—whichever one is being cleaned—this could result in an undesirably intense cooling of the hot gas flowing through the associated chamber $A_1$ or $B_1$ or $C_1$, as the case may be, and thus in insufficient vaporization and removal of the contaminants. To prevent this, provision is furthermore made for carrying the fresh air that is to be heated by the heat exchangers A, B and C around the heat exchanger that is being cleaned, and therefore the duct 6 also has in the vicinity of heat exchanger C a bypass line 6c bypassing same, in the vicinity of the heat exchanger B a bypass line 6b bypassing same, and in the vicinity of heat exchanger A a bypass line 6a bypassing the latter. To be able to perform the bypass desired in each case, a shut-off means 6C is provided in the duct 6 between its point of entry into heat exchanger C and the connection of the bypass 6c, a shut-off means 6B between its point of entry into heat exchanger B and the connection of the bypass 6b, and a shut-off means 6A between its point of entry into heat exchanger A and the connection of the bypass 6a, and finally an additional shut-off means 6'C, 6'B and 6'A in each of the bypass ducts 6c, 6b and 6a.

The operations of the above-mentioned shut-off means required for the operation of the dryer installation can be understood from the appended table, both in the case of the operation of the dryer installation with all of the heat exchangers A, B and C connected to the exhaust gas stream (FIG. 2), and in the case of the operation of the system while cleaning heat exchanger A or B or C, namely with the heat exchangers B and C remaining inserted into the exhaust gas stream (FIG. 3), and with A and C remaining inserted (FIG. 4), or A and B remaining inserted (FIG. 5), the unused ducts and the closed shut-off means not being represented in FIGS. 2 to 5, for the sake of ease of comprehension.

When the installation is operated while one of the heat exchangers A, B and C is being cleaned, the fan 10 is turned on and a portion of the hot gas with a tempera-

TABLE

|  | A | B | C | 3A | 3B | 3C | 3'A | 3'B | 3'C | 11A | 11B | 11C | 8A | 8B | 8C | 9A | 9B | 9C | 6A | 6B | 6C | 6'A | 6'B | 6'C |
|---|---|---|---|---|---|---|---|---|---|---|---|---|---|---|---|---|---|---|---|---|---|---|---|---|
| Working (FIG. 2) | x | x | x |   |   |   |   |   |   |   |   |   |   |   |   |   |   |   |   |   |   |   |   |   |
| Cleaning |   |   |   | + | + | + | + | + | + | − | − | − | − | − | − | − | − | − | + | + | + | − | − | − |
| Working (FIG. 3) |   | x | x |   |   |   |   |   |   |   |   |   |   |   |   |   |   |   |   |   |   |   |   |   |
| Cleaning | x |   |   | − | + | + | − | + | + | + | − | − | + | − | − | + | − | − | − | + | + | + | − | − |
| Working (FIG. 4) | x |   | x |   |   |   |   |   |   |   |   |   |   |   |   |   |   |   |   |   |   |   |   |   |
| Cleaning |   | x |   | + | − | + | + | − | + | − | + | − | − | + | − | − | + | − | + | − | + | − | + | − |
| Working (FIG. 5) | x | x |   |   |   |   |   |   |   |   |   |   |   |   |   |   |   |   |   |   |   |   |   |   |
| Cleaning |   |   | x | + | + | − | + | + | − | − | − | + | − | − | + | − | − | + | + | + | − | − | − | + |

State of operation (working or cleaning) of heat exchangers A, B and C is marked x
Shut-off means closed = (−); shut-off means open = (+)

ture of about 800° C. is taken from the combustion chamber and is cooled to the cleaning temperature desired, e.g., to 400° to 500° C., by the admixture of fresh air through an entry connection 13 at a mixing valve 12 situated in duct 8 ahead of the first branch duct 8c, and at the same time it is enriched with the oxygen from the fresh air. It then flows through the associated chambers $A_1$, $B_1$ or $C_1$, while the associated chambers $A_2$, $B_2$ or $C_2$ are simultaneously shut off from the fresh air stream, thus causing the previously deposited contaminants to become completely detached and vaporized, and carried by the hot gas partial stream through the duct 9 or they are carried first through one of the two branches 9b or 9c into the combustion zone of the combustion chamber 1, where they are burned up.

Although a description has been given above of the cleaning of heat exchanger A, which is first in the order in which the exhaust gases flow through the apparatus, it is nevertheless to be noted that in the last heat exchanger C through which the exhaust gases pass, a more rapid build-up of contaminants is to be expected than in heat exchanger A, because of the degree to which the exhaust gas has been cooled by the time it reaches it.

To prevent the heat recovery from being impaired by the cleaning out of one of the heat exchangers, the heat exchanger group can have one more heat exchanger than is necessary for the desired heat exchange. In the embodiment that has been described and represented, even two of the three heat exchangers A, B and C could provide for the desired heat recovery. Since the amount of time required for the cleaning of one of the heat exchangers A, B and C is very short in the course of continuous operation of the system, such oversizing of the heat exchanger group could also be dispensed with. If even only one heat exchanger is basically sufficient for the heat recovery, nevertheless two or more heat exchangers are to be preferred so as to avoid complete interruption of the heat recovery during the cleaning, and these heat exchangers can, of course, be arranged in any desirable manner, i.e., instead of connecting them in series in the manner described and represented, they could be connected parallel or in any mixed method of arrangement.

I claim:

1. A plant for drying organic substances, especially wood chips or the like, comprising, a combustion chamber for generating hot gas and connected to a dryer for said substances, at least one indirect heater exchanger having primary and secondary sides, first duct means for passing contaminated exhaust gases from said dryer through the primary side of said heat exchanger during a normal operation phase, second duct means connectable to said dryer for bypassing said heat exchanger during a cleaning phase, third duct means connectable to said combustion chamber and the primary side of said heat exchanger to direct a portion of the hot gas thereto during the cleaning phase and return the same to said combustion chamber, and valve means to close said second and third duct means during the normal operation phase and to open said second and third duct means and close said first duct means during the cleaning phase for the heat exchanger.

2. A plant according to claim 1, wherein the secondary side of the heat exchanger is provided with duct means for a medium to be heated therein and a bypass means is further provided for bypassing said secondary side during the cleaning phase.

3. A plant according to claim 1 or claim 2, wherein a mixing valve, having means for introducing fresh air into the valve, is provided in said third duct means.

4. A plant according to claim 3, wherein a plurality of heat exchangers are provided, each provided with said ducts, the corresponding ducts being connected to each other.

5. A plant according to claim 4, wherein said heat exchangers are arranged in series with respect to the ducts carrying said exhaust gas and said medium, respectively.

6. A plant according to claim 1, wherein a fan is disposed in said third duct means between said heat exchanger and said combustion chamber.

* * * * *